United States Patent

Khan et al.

[11] Patent Number: 5,877,923
[45] Date of Patent: Mar. 2, 1999

[54] HEAD SUSPENSION ASSEMBLY

[75] Inventors: Amanullah Khan, Pleasanton; Samantha Korm, San Jose, both of Calif.

[73] Assignee: Read Rite Corporation, Milpitas, Calif.

[21] Appl. No.: 937,194

[22] Filed: Sep. 25, 1997

Related U.S. Application Data

[63] Continuation of Ser. No. 707,110, Sep. 3, 1996, abandoned, which is a continuation of Ser. No. 517,216, Aug. 21, 1995, abandoned.

[51] Int. Cl.⁶ .............................. G11B 5/49; G11B 21/16
[52] U.S. Cl. ............................................................ 360/104
[58] Field of Search ................................... 360/103, 104, 360/105

[56] References Cited

U.S. PATENT DOCUMENTS

| | | | |
|---|---|---|---|
| 4,829,395 | 5/1989 | Coon et al. | 360/104 |
| 4,868,694 | 9/1989 | Hagen | 360/104 |
| 5,027,241 | 6/1991 | Hatch et al. | 360/105 |
| 5,138,507 | 8/1992 | Zarouri et al. | 360/104 |
| 5,225,950 | 7/1993 | Crane | 360/104 |
| 5,296,983 | 3/1994 | Blanc et al. | 360/104 |
| 5,299,081 | 3/1994 | Hatch et al. | 360/104 |
| 5,311,384 | 5/1994 | Johnson | 360/104 |
| 5,386,331 | 1/1995 | Wolter | 360/104 |
| 5,434,731 | 7/1995 | Hagen | 360/104 |
| 5,442,504 | 8/1995 | Nagase et al. | 360/104 |
| 5,461,525 | 10/1995 | Christianson et al. | 360/104 |
| 5,537,274 | 7/1996 | Imasaki | 360/104 |
| 5,570,249 | 10/1996 | Aoyagi et al. | 360/104 |

FOREIGN PATENT DOCUMENTS

| | | | |
|---|---|---|---|
| 0155746 | 9/1985 | European Pat. Off. | 360/104 |

*Primary Examiner*—A. J. Heinz
*Assistant Examiner*—William R. Korzuch
*Attorney, Agent, or Firm*—Robert King; Samuel A. Kassatly

[57] ABSTRACT

A magnetic head suspension assembly includes a load beam which enables a close disk-to-disk spacing in a disk drive, high production yield, and increased torsional stiffness and resistance to vibrational modes. The load beam has a low profile, high resonance configuration, which minimizes the overall size of the magnetic head suspension assembly, and which improves manufacturability and robustness of magnetic head suspension assemblies by increasing the load beam resonance frequency and reducing the oscillation gain. The load beam is formed with a forward section that extends rearwardly into a central major section, a flexure secured to the forward section, and an air bearing slider secured to the flexure for free gimbaling motion while flying above an associated disk during operation in a disk drive. The forward section of the load beam covers substantially the entire surface of said flexure to provide it with sufficient rigidity and support. The load beam further includes a rail that extends partly above and partly below the major section, such that the part that extends above the major section tapers progressively from one end to another. The rail defines a U-shaped or V-shaped trough.

16 Claims, 4 Drawing Sheets

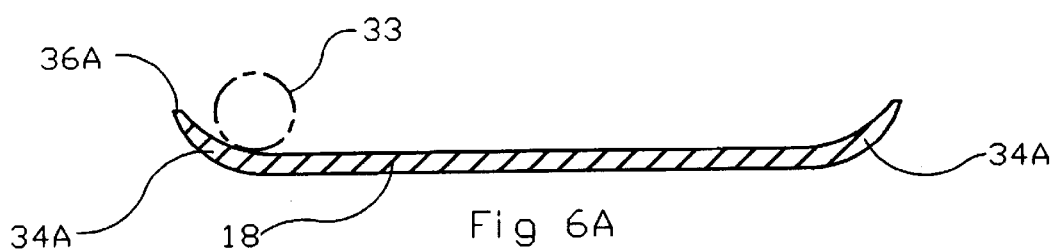
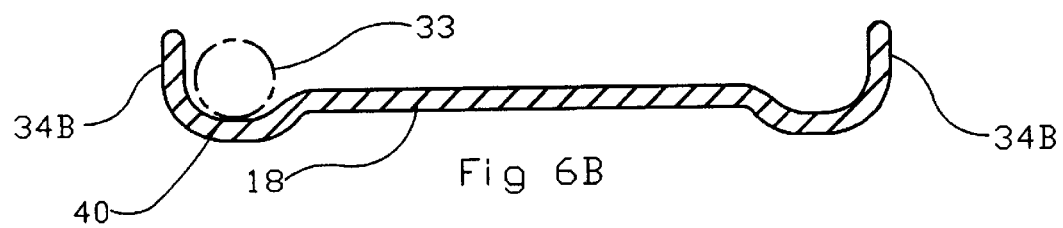
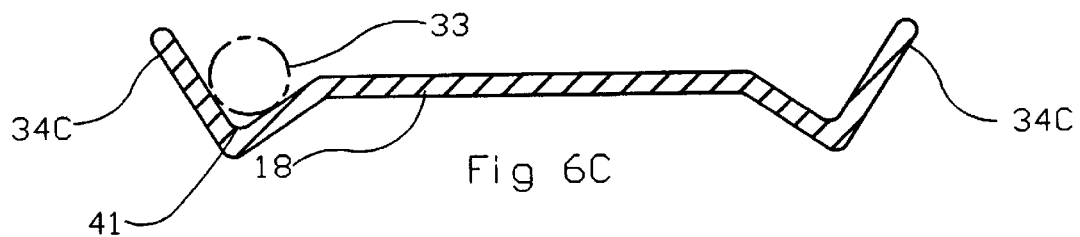
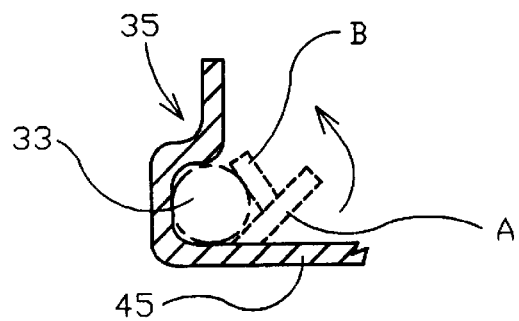
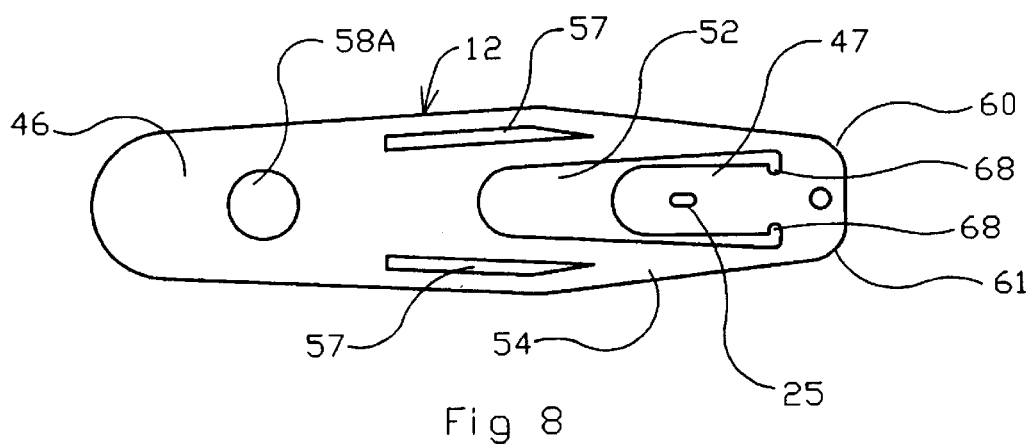

HEAD SUSPENSION ASSEMBLY

This application is a continuation of application Ser. No. 08/707,110, filed on Sep. 3, 1996, now abandoned, which is a continuation of application Ser. No. 08/517,216, filed on Aug. 21, 1995, now abandoned.

CROSS-REFERENCE TO U.S. PATENT

U.S. Pat. No. 5,568,332 issued Oct. 22, 1996 to the same assignee, discloses a configuration of a flexure that is used with a magnetic head suspension assembly. The subject matter of the copending application is incorporated herein by reference.

FIELD OF THE INVENTION

This invention relates to an improved magnetic head suspension assembly and in particular to a magnetic head load beam configuration.

DESCRIPTION OF THE PRIOR ART

Disk drives typically include a stack of spaced apart, concentric disks mounted on a common shaft, and an actuator arm assembly encased within a housing. The actuator arm assembly typically comprises a plurality of arms extending into the spaces between the disks. Mounted on the distal end of each arm is a resilient load beam which in turn carries a miniaturized head gimbal assembly (HGA). Included in the gimbal assembly is an air bearing slider pivotally attached to a flexure. A magnetic transducer, employed to interact with an associated magnetic disk, is affixed to the slider.

The flexure and attached slider are subject to oscillation and vibration, particularly at high resonant frequencies, and also are subject to bending and twisting forces and sway or lateral displacement. During the startup of a disk drive and during the seek mode, when the head accesses the data tracks and is moved radially between selected data tracks, the flexure may experience undue vibration at a resonant frequency. Also, if the head assembly is suddenly stopped at a crash stop, which is typically located near the radial ends of the data tracks, the unit may undergo track failure or other mechanical disturbance so that the flexure and its slider will experience shock and oscillate, particularly at a high resonant frequency. In addition, excessive bending of the flexure during disk drive operation can cause fatigue of the flexure metal body and may result in breakage at high amplitude oscillations. A desired objective of flexure design is to increase all the resonance frequencies to reduce the amplitude of the oscillations.

One objective in the design of load beams used in head suspension assemblies is the reduction of the load beam rail height in order to minimize the overall profile of the magnetic head suspension assembly and the size of the disk drive. However, such rail height is limited by the size of the tubing containing the service wire. As used herein, a service wire is a continuation of the service loop that extends over or alongside the load beam.

Generally, the tip of a conventional load beam is too narrow to allow the routing and the tacking of the service loop. As a result, the distal end of the service loop is bonded to the transducer, and the service wire is passed on top of the flexure tip. In such conventional configurations, the forward end of the flexure is exposed and is not firmly secured to the load beam. Consequently, the service loop must be very carefully handled and adjusted to avoid damaging the unsupported part of the flexure. The yield of conventional magnetic head suspension assemblies is generally reduced due to flexure damages that result during the handling and manufacture of these assemblies.

Additionally, the service loop is prone to getting nicked as a result of accidental thrust against sharp objects, tools, or the load beam edge. Furthermore, the insulation layer of the service loop is very thin, on the order of 0.5 mils, and can be very readily damaged. Once the inner conductor of the service loop is exposed, the reliability and operation of the magnetic head assembly are affected, and production yield is reduced.

SUMMARY OF THE INVENTION

An object of this invention is to provide a suspension assembly with a low load beam rail profile for minimizing the overall size of the magnetic head.

Another object of this invention is to provide a low profile magnetic head suspension assembly with improved manufacturing yield.

Another object of this invention is to reduce the load beam rail profile of a magnetic head suspension assembly without affecting the resonance of the head gimbal assembly.

A further object of this invention is to provide an optimized high resonance load beam for improving the design manufacturability and robustness of magnetic head suspension assemblies, by increasing the load beam resonance frequency and reducing the amplitude or gain of the oscillations.

According to this invention, a magnetic head suspension assembly incorporates a flexure which is formed with a load beam for enabling the realization of a close disk-to-disk spacing (height compaction), high manufacturing yield of the head assembly, and increased torsional stiffness and resistance to vibrational modes. The load beam is formed with a low profile, high resonance load beam configuration which minimizes the overall size of the magnetic head, and which improves the design manufacturability and robustness of magnetic head suspension assemblies by increasing the load beam resonance frequency and reducing the oscillation gain. The load beam is formed with a forward section that extends rearwardly into a central major section, a flexure secured to the forward section, and an air bearing slider secured to the flexure for free gimbaling motion while flying above an associated disk during operation in a disk drive. The forward section of the load beam covers substantially the entire surface of said flexure to provide it with sufficient rigidity and support.

The load beam further includes a rail that extends partly above and partly below the central major section, such that the part that extends above the major section tapers progressively from one end to another. The rail defines a trough which may be either U-shaped or V-shaped.

The load beam is characterized by a plurality of resonance modes, including a first torsion mode, a second torsion mode, and a sway mode. The first torsion mode ranges between 2–3 kHz (kiloHertz) approximately, while the second torsion mode ranges between 5.5–7 kHz approximately, and the sway mode occurs at around 10 kHz.

The invention disclosed herein is particularly applicable to magnetic head suspension assemblies incorporating nanosliders, which are about 0.080 inch long, 0.063 inch wide and 0.017 inch in height, but is not limited to such a particular application.

BRIEF DESCRIPTION OF THE DRAWING

The invention will be described in greater detail with reference to the drawing in which:

FIG. 6A is a cross-sectional view of the load beam of FIG. 1 taken along line 6—6 thereof, and illustrating the rail profile of FIG. 4;

FIG. 6B is a cross-sectional view of the load beam of FIG. 1 taken along line 6—6 thereof, and illustrating a U-shaped low profile rail of FIG. 5;

FIG. 6C is a cross-sectional view of the load beam of FIG. 1, taken along line 6—6 thereof, and illustrating a V-shaped low profile rail of FIG. 5;

FIG. 7 is an enlarged cross-sectional view of a service wire capture platform used to retain the service wire within the rail, alongside the load beam;

FIG. 8 is an enlarged plan view of a flexure forming part of the head suspension assembly of FIG. 1;

Similar numerals refer to similar elements in the drawing. It should be understood that the sizes of the different components in the Figures may not be in exact proportion, and are shown for visual clarity and for the purpose of explanation.

DETAILED DESCRIPTION OF THE INVENTION

Figure 1:
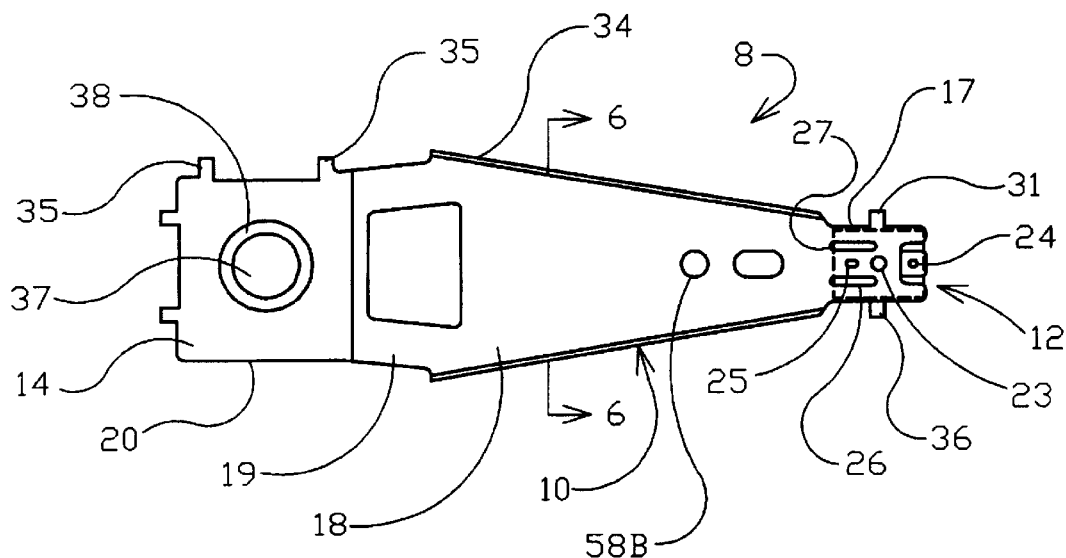
FIG. 1 is a top plan view of a head suspension assembly comprising the novel load beam of this invention.
Figure 2:
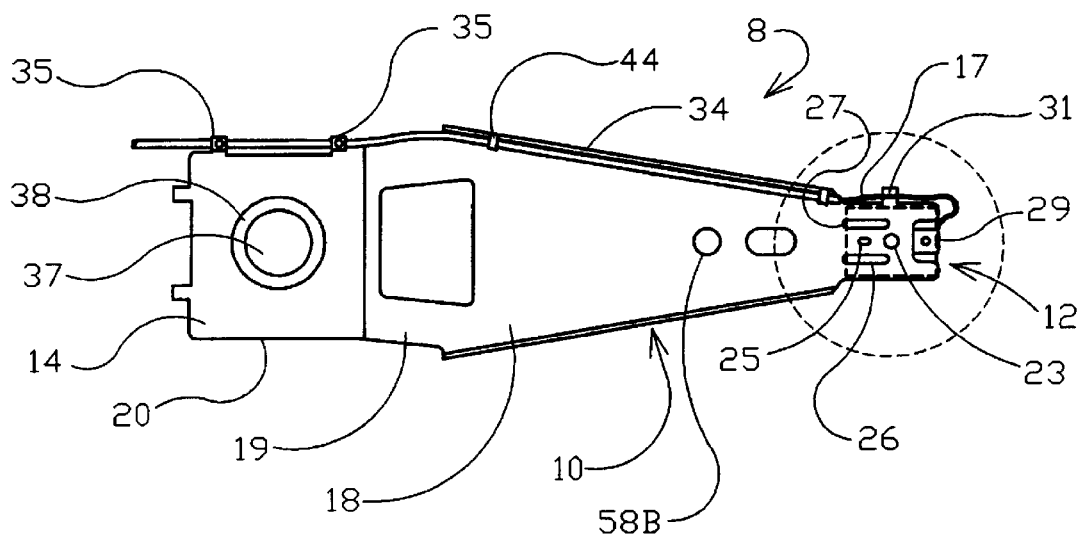
FIG. 2 is a top plan view of the head suspension assembly of FIG. 1 showing a service wire extending alongside the load beam.
Figure 4:
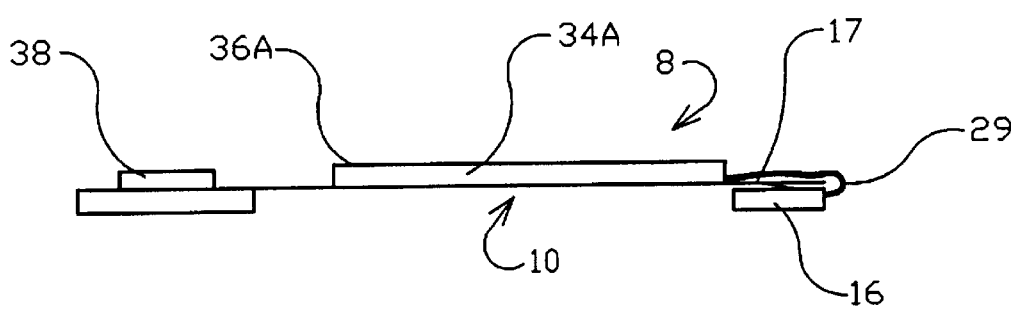
FIG. 4 is a side view in elevation of the head suspension assembly of FIG. 2, showing a first rail design.
Figure 5:
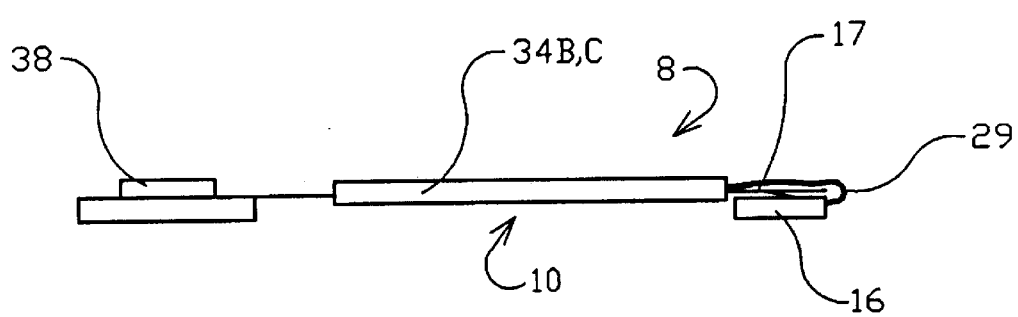
FIG. 5 is a side view in elevation of the head suspension assembly of FIG. 2, showing another low profile rail design of this invention.

FIGS. 1 and 2 illustrate a head suspension assembly 8 generally formed of a load beam 10, a flexure 12, a swage plate 14 and an air bearing slider 16 (shown in FIGS. 4 and 5). A thin film transducer (not shown) having a transducing gap is deposited at the end of the slider 16, as is well known in the art. The load beam 10 includes a forward section 17 that extends integrally to the rear into a central triangular-type major section 18, and a leaf spring or flexible section 19 intermediate the major section 18 and a rectangular rear mount section 20.

In accordance with this invention, the forward section 17 of the load beam 10 covers substantially the entire surface of the flexure 12, except for a small portion that has a curing hole 24, to provide the flexure 12 with sufficient rigidity and support, and to protect it from handling damage during handling and manufacture, thus improving the overall manufacturing yield.

Figure 3:
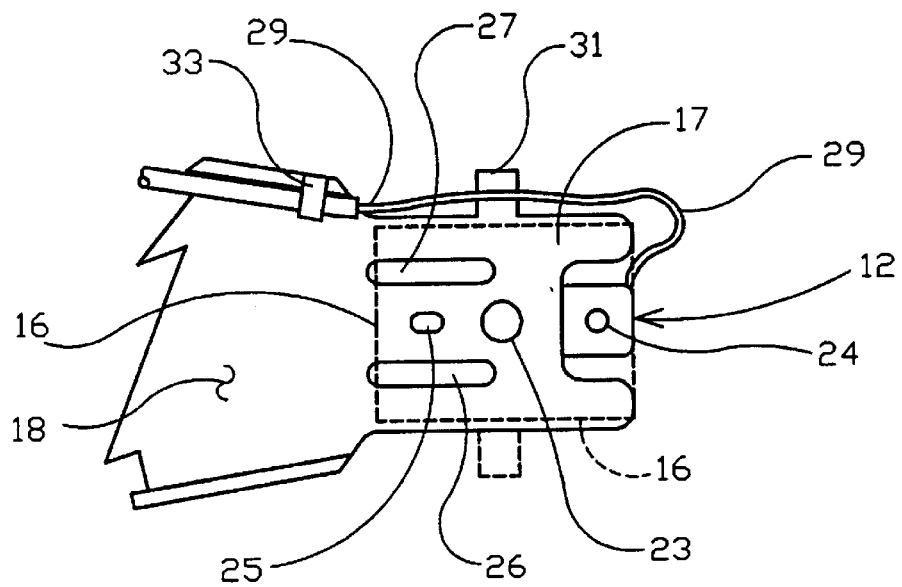
FIG. 3 is an enlarged view of the distal end of the head suspension assembly of FIG. 2 contoured by a circle shown in dashed lines.

As further illustrated in FIG. 3, the forward section 17 of the load beam 10 is generally flat and rectangularly shaped, and covers the slider 16 (shown in dashed lines). In a preferred embodiment, the forward section 17 does not necessarily extend beyond the front end of the flexure 12. The forward section 17 includes a dimple 23, and a plurality of tooling alignment holes and UV (ultraviolet) curing holes, such as holes 25 through 27. These holes 25 through 27 are used to enable the proper alignment and faster bonding of the flexure 12 to the load beam 10. The front tip of the forward section 17 may define a small recess for exposing an alignment and curing hole 24 in the flexure.

The forward section 17 includes a lateral tab 31 that extends outwardly from one of its sides for supporting a service loop 29. In this particular design, the service loop 29 is secured at one end to the transducer using well known bonding methods. The service loop 29 is then routed to the side of the forward section 17, and tacked onto the tab 31. As a result of securing the service loop 29 to the rigid tab 31, the risk of damaging the flexure 12 during the manufacture process is significantly reduced.

Additionally, since the service loop 29 is passed alongside the flexure 12 rather than on top of it, the service loop 29 no longer floats freely as it does in conventional magnetic head assemblies. Consequently, the risk of nicking and damaging the service loop 29 as a result of accidental thrust against sharp objects, tools, or the load beam edge, is substantially reduced.

The service loop 29 extends rearwardly inside a tubing 33. The tubing 33 is routed along the length of the major section 18 and is nested within a rail 34 that will be described in connection with FIGS. 4 through 6C. The tubing 33 further extends rearwardly and is held by a retainer element 44, alongside the load beam 10, and is crimped to the swage plate 14 at one or more locations. In one embodiment, the tubing 33 is crimped to a pair of laterally protruding tabs 35.

While the present magnetic head suspension assembly 8 is described as having a single side tab 31 forming part of the forward section 17, it should be understood that one or more other tabs, such as tab 36 (shown in dashed lines) may be added at various positions of the forward section 17. Similarly, it should be clear that other side tabs, similar to tabs 35 may also be added to the same or opposite side of the major section 18.

In the present embodiment, the major section 18 of the load beam 10 is generally wider than the load beams of conventional designs, and provides sufficient space for routing the tubing 33 within the rail 34. By virtue of the modified load beam configuration which includes the extended forward section 17, a significant improvement in the manufacturing yield of magnetic head suspension assemblies is realized.

A hole or opening 37 is provided in the rear section of the load beam 10 to allow joinder by laser welding of the swage plate 14 to the load beam 10 by a boss 38. The swage plate 14 provides stiffness to the rear section of the load beam 10. Relief slots (not shown) may also be provided to reduce stresses and to avoid kinking, thus maintaining the flatness of the rear section.

FIGS. 4 and 6A illustrate a rail 34A for retaining the tube 33 (shown in dashed lines). In this particular embodiment, the rail 34A extends entirely above the flat surface of the major section 18 of the load beam 10. The upper edge 36A of the rail 34A is at about the same height as the tubing 33, and may extend uniformly along almost the entire length of the major section 18. The rail height may therefore be generally limited by the size of the tubing 33.

FIGS. 5, 6B and 6C illustrate two improved rails both of which enable the design of a low profile load beam 10. FIG. 6B illustrates a generally U-shaped rail 34B that extends partly above and partly below the flat surface of the major section 18 of the load beam 10, to form a U-shaped trough 40 in which the tubing 33 may be nested. In accordance with this design, part of the tubing 33 is retained below the flat surface of the major section 18, with only a part of it protruding above the major section 18. In the embodiment illustrated in FIG. 5, the portion of the rail 34B above the major section 18 gradually tapers from one end, such as the rear end of the rail to its other end, such as the forward end.

The V-shaped rail 34C shown in FIG. 6C is basically similar to the U-shaped rail 34B, with the exception that the rail 34C defines a V-shaped trough 41 in which the tubing 33 rests.

As a result of the improved rail design, it is now possible to reduce the profile of the rail 34 and the height of the boss 38, thus minimizing the overall profile of the magnetic head suspension assembly and decreasing the disk-to-disk height compaction.

FIG. 7 illustrates a service wire capture platform 35 for retaining the tubing 33 within the trough 40 or 41 of the rail 34B or 34C, respectively. While only two platforms 35 are illustrated in FIG. 2, it should be clear that other platforms may also be used along the length of the rails 34A, 34B or 34C. The improvement in the design of the platform 35 includes a long crimp tab 45 which enables the platform 35 to be crimped either manually or automatically. The automatic crimping of the platform 35 may be a multi-stage process, as illustrated in dashed lines, whereby a stylus (not shown) pushes against, and bends the tab 45 upward to a first intermediate position A. Thereafter, the stylus again pushes against, and bends the tab 45 from its intermediate position A to its final position B.

The flexure 12 is attached at the front end of the load beam 10, by welding for example. As shown in FIG. 8, the flexure 12 is fabricated with an oval rear end 46 and a U-shaped finger 47 at the front end. The base of the U-shaped finger 47 points towards the oval rear end 46. The finger 47 is defined by a surrounding horseshoe-shaped or U-shaped cutout 52 that is formed around the finger 47. Outrigger sections 54 are disposed between the cutout 52 and the perimeter or sides of the flexure 12. The outriggers 54 serve as stabilizer sections to achieve low roll stiffness during operation of a disk drive using the head suspension assembly.

By widening the middle portion of the flexure 12 and by narrowing the front end and its rear end 46, the external roll moment effect is effectively reduced. The modified flexure design is characterized by high resonance frequencies and the desired high lateral stiffness. The width of the flexure finger 47 is made relatively wide to improve the bond strength between the slider and the flexure. A wide flexure design allows a flatter shape, i.e., a better planarity of the structure, in forming and fabricating the suspension. Roll stiffness is reduced by tapering the cutout section.

When the head suspension is loaded to a rotating disk in a disk drive, the flexure 12 allows the slider 16 to follow the variations in topography of the rotating disk surface. The hemispherical load dimple 23 is stamped in the flexure finger 47. The height of the load dimple 23 is minimized to keep the Z-height (vertical height of the head suspension) as small as possible. However sufficient clearance space is provided between the load beam 10 and the slider 16 to allow free gimbaling of the slider 16 as it pitches and rolls about the load dimple 23 without interference by the load beam 10.

Narrow elongated slots 57 are formed in the outrigger sections 54. These slots 57 are preferably triangular-type in shape having the triangle apex facing to the front end of the flexure 12 and the triangle base facing to the rear end of the flexure 12. This triangular shape maintains uniform stresses in the structure. The flexure is configured with primary stabilizer sections and secondary stabilizer arms that are separated by the elongated slots. The stabilizer sections and arms act to reduce pitch and roll stiffness while increasing lateral stiffness. As a result, the flying height of the slider is maintained substantially constant during transducing of the data registered on a surface of a rotating magnetic disk.

A tooling hole 58A, which corresponds to a tooling hole 58B in the load beam 10 (FIGS. 1, 2) is used for alignment purposes and provides a reference point for locating the slots 57. Using the center of the circular tooling hole 58A as the reference point, the front of each of the slots 57, is located at approximately ⅔ of the distance from the reference point to the front end of the flexure 12, while the rear end of each slot is located at about ⅓ of the same distance from the reference point. The distance of the center of the tooling hole 58A to the center of the load dimple 23 is about 0.210 inch. The corners 60, 61 of the front end peripheral outline of the flexure 12 are smoothly bowed so as to avoid catching the service loop or other objects. Aperture ears 68 facilitate the bending of the front portion of the flexure 12, which serves to strengthen the front end portion of the flexure 12 and to preclude distortion of the flexure body.

In an actual implementation of the invention, a flexure 12 which supports a nanoslider was made of type 304 stainless steel of about 0.0012 inch thick material having a maximum width of 0.080 inch, a front end of width of about 0.063 inch, a rear end width of about 0.060 inch and a length of about 0.025 inch. The flexure finger 47 was formed with a depression or bend of about 0.002 to 0.003 inch relative to the plane of the flexure body. The width of each secondary stabilizer arm was about 0.006 inch whereas the width of each primary stabilizer section was about 0.008–0.010 inch. The width of the base of each triangular-type slot 57 was about 0.005 inch.

According to this invention, the resonance characteristic of the load beam 10 is optimized by increasing its resonance frequency and reducing the amplitude or gain of the oscillations. This improvement is achieved, at least in part, by widening the major section 18, which increases the torsional stiffness of the load beam 10 and causes its resonance frequency to increase. Vibration modes in a load beam are known, and at least some of these modes are described in U.S. Pat. No. 5,027,241 to Hatch et al., which is incorporated herein by reference.

Figure 9A:
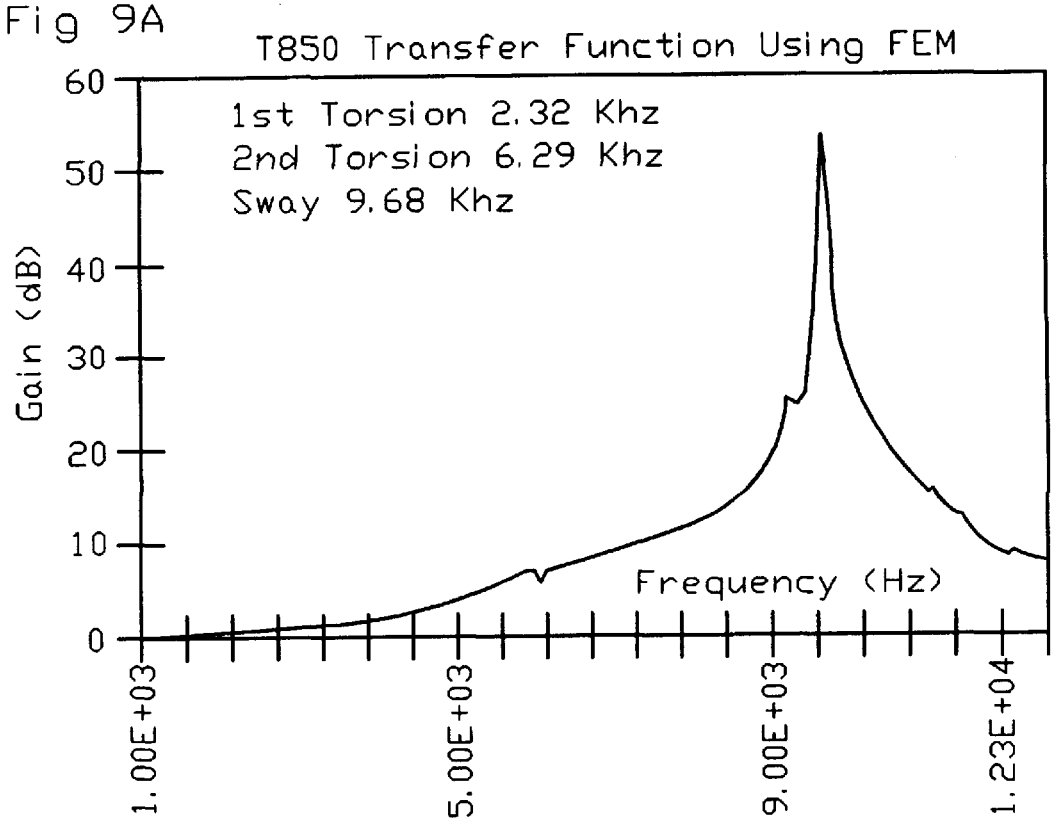
FIG. 9A is a simulated resonance graph of the load beam of FIG. 2, illustrating gain as a function of frequency.
Figure 9B:
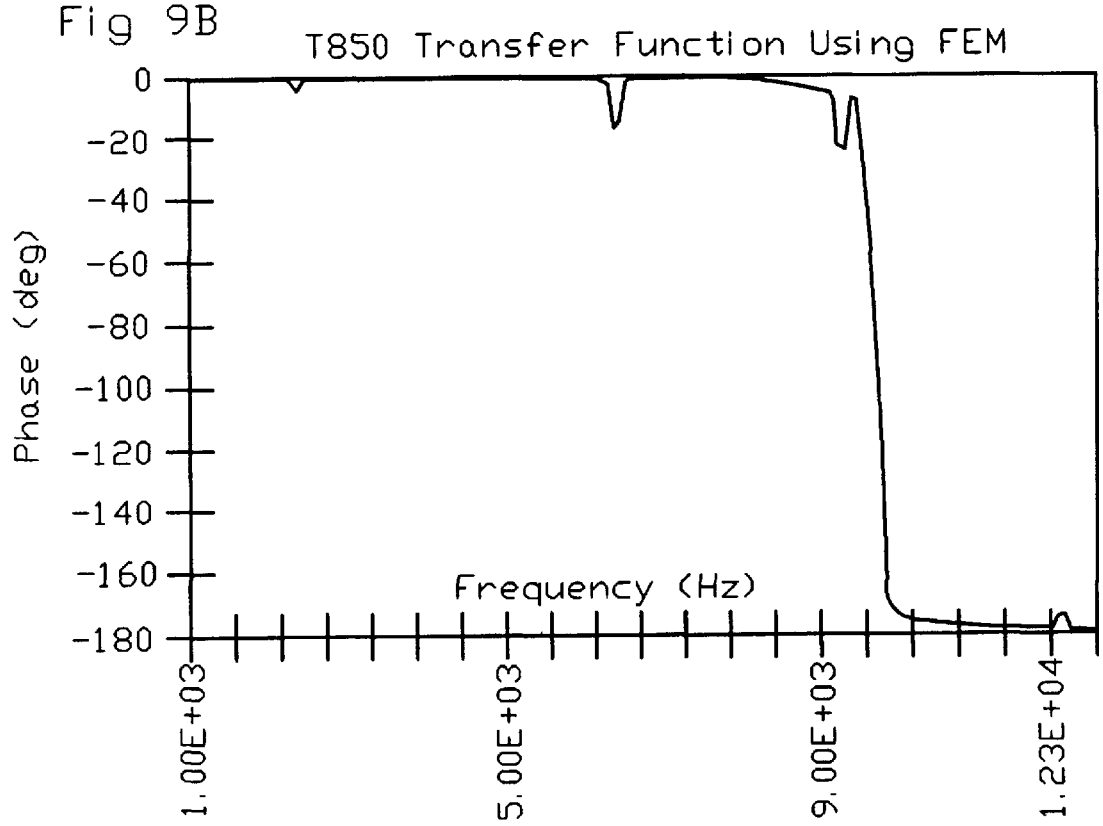
FIG. 9B is a simulated resonance graph of the load beam of FIG. 2, illustrating phase as a function of frequency.

The first torsion off-track mode of vibration for the load beam 10 generally ranges between 2 kHz and 2.8 kHz; the second torsion generally ranges between 5.5 kHz and 7 kHz; and the sway mode occurs at around 10 kHz. In the simulation illustrated in FIGS. 9A and 9B, the first torsion occurs at about 2.32 kHz, the second torsion occurs at about 6.29 kHz, and the sway mode occurs at about 9.68 kHz.

By virtue of the invention, a close disk-to-disk spacing, high manufacturing yield of the head assembly, and increased torsional stiffness and resistance to vibrational modes are effectively realized.

It should be understood that the invention is not limited to the specific parameters, materials and embodiments described above. Various modifications and variations may be made within the scope of the present invention.

What is claimed is:

1. A head suspension assembly for transducing data that is recorded and read out from a surface of a recording medium, comprising:

a load beam having a forward section that extends into a central major section;

said forward section including a tab that supports a service loop and that allows said service loop to be routed alongside said forward section;

a flexure secured to said forward section and having a front end;

said forward section including a tip, wherein said tip defines a small recess for exposing an alignment and curing hole in the front end of said flexure;

a slider secured to the front end of said flexure; and wherein said forward section of said load beam almost entirely covers said slider and said flexure except at said small recess to provide said flexure with support and protection.

2. A head suspension assembly as in claim 1 wherein said forward section is generally flat.

3. A head suspension assembly as in claim 1 wherein said forward section includes ultraviolet curing and tooling alignment holes for aligning said flexure to said forward section.

4. A head suspension assembly as in claim 1 wherein said tab is substantially flat, and extends laterally and integrally from said forward section.

5. A head suspension assembly as in claim 1 wherein said tab extends laterally from said forward section;

wherein said load beam further includes one or more tabs that extend laterally from said central major section; and wherein said service loop tubing is secured to said one or more tabs extending from said central major section.

6. A head suspension assembly as in claim 1 further including a rail connected to said central major section; and wherein said rail extends entirely above said central major section.

7. A head suspension assembly as in claim 1 further including a rail and a tubing surrounding said service loop; and wherein said rail defines a generally U-shaped trough for seating said tubing.

8. A head suspension assembly as in claim 1, further including a rail connected to said central major section and a tubing surrounding said service loop; and wherein said rail defines a generally V-shaped trough for seating said tubing.

9. A head suspension assembly as in claim 1 wherein said load beam has a plurality of resonance modes that include a first torsion mode, a second torsion mode, and a sway mode; and wherein said first torsion mode generally ranges approximately between 2 kHz and 2.8 kHz.

10. A head suspension assembly as in claim 9 wherein said second torsion mode generally ranges approximately between 5.5 kHz and 7 kHz; and wherein said sway mode occurs at around 10 kHz.

11. A head suspension assembly as in claim 1 further including:

a rail that extends alongside said central major section;

a tubing nested within said rail; and wherein said service loop is disposed at least in part within said tubing.

12. A head suspension assembly as in claim 11 wherein said rail extends at least partly above said central major section.

13. A head suspension assembly as in claim 11 wherein said rail extends partly above said central major section and partly below said central major section.

14. A head suspension assembly as in claim 13 wherein the part of said rail that extends above said central major section tapers progressively from one end to another.

15. A head suspension assembly as in claim 11 wherein said rail defines a trough for accommodating said tubing.

16. A head suspension assembly as in claim 11 including a platform for capturing said tubing within said rail, and wherein said platform includes an elongated crimp tab for enabling the automatic crimping of said tubing.

* * * * *